US012725237B2

(12) United States Patent
Toyohara

(10) Patent No.: US 12,725,237 B2
(45) Date of Patent: Sep. 1, 2026

(54) IMAGE PROCESSING APPARATUS, IMAGE PICKUP APPARATUS, AND IMAGE PROCESSING METHOD

(71) Applicant: CANON KABUSHIKI KAISHA, Tokyo (JP)

(72) Inventor: Yohei Toyohara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 279 days.

(21) Appl. No.: 18/422,204

(22) Filed: Jan. 25, 2024

(65) Prior Publication Data

US 2024/0265513 A1 Aug. 8, 2024

(30) Foreign Application Priority Data

Feb. 3, 2023 (JP) ................................ 2023-015071

(51) Int. Cl.
*G06T 7/00* (2017.01)
*G06T 7/13* (2017.01)

(52) U.S. Cl.
CPC .............. *G06T 7/0002* (2013.01); *G06T 7/13* (2017.01); *G06T 2207/20081* (2013.01)

(58) Field of Classification Search
CPC ..................... G06T 7/0002; G06T 7/13; G06T 2207/20081; G06T 2207/30168; G06T 5/73
See application file for complete search history.

(56) References Cited

U.S. PATENT DOCUMENTS

2009/0080790 A1* 3/2009 Hasegawa .......... H04N 23/6811 382/260
2009/0214121 A1* 8/2009 Yokokawa ................ G06T 7/13 382/199
2011/0317044 A1* 12/2011 Ishii .......................... G06T 5/73 348/241
2013/0063625 A1* 3/2013 Yamanaka ............. G06T 7/254 348/E5.051
2014/0118509 A1* 5/2014 Kroon .................. H04N 13/111 348/51
2014/0152877 A1* 6/2014 Honsho .................. G03B 29/00 348/239
2021/0150751 A1* 5/2021 Liu ...................... G06V 30/274
2021/0158021 A1* 5/2021 Wu ...................... G06V 10/764
2021/0407052 A1* 12/2021 Wang ...................... G06F 18/22
2022/0058426 A1* 2/2022 Song ...................... G06V 10/82
2024/0087333 A1* 3/2024 Hari ...................... G06V 10/25

(Continued)

FOREIGN PATENT DOCUMENTS

CN 114187491 A * 3/2022 ............ G06F 18/24
JP 4334179 B2 * 9/2009

(Continued)

*Primary Examiner* — Henok Shiferaw
*Assistant Examiner* — Woo C Rhim
(74) *Attorney, Agent, or Firm* — Cowan, Liebowitz & Latman, P.C.

(57) ABSTRACT

An image processing apparatus includes a memory storing instructions, and a processor configured to execute the instructions to detect a shielding object that shields part of a main object in an evaluation image obtained by imaging the main object, and evaluate deterioration in a portion of the main object excluding the shielding object in the evaluation image.

19 Claims, 5 Drawing Sheets

(56) References Cited

U.S. PATENT DOCUMENTS

2024/0265513 A1* 8/2024 Toyohara .................. G06T 5/73
2024/0290075 A1* 8/2024 Yuille .................... G06V 10/25
2025/0371883 A1* 12/2025 Sohn ...................... G06V 10/26

FOREIGN PATENT DOCUMENTS

JP 2009253936 A * 10/2009
JP 2021108023 A * 7/2021

* cited by examiner

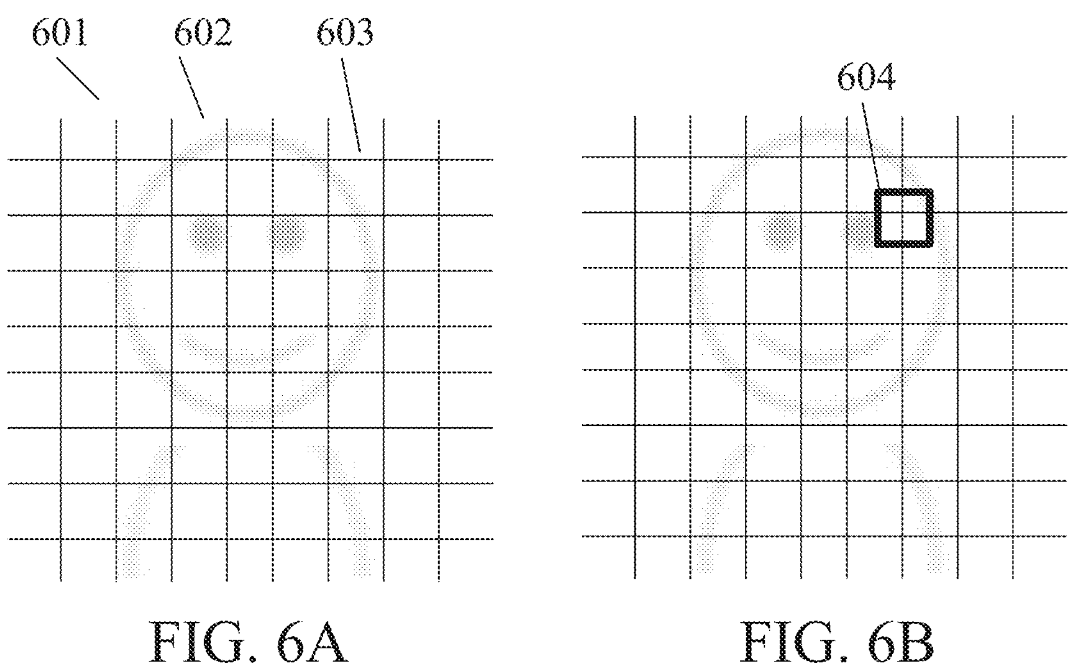
FIG. 6A
FIG. 6B
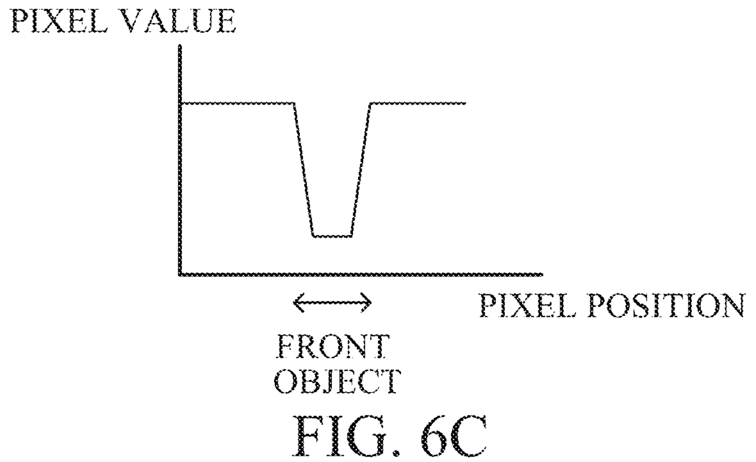
FIG. 6C
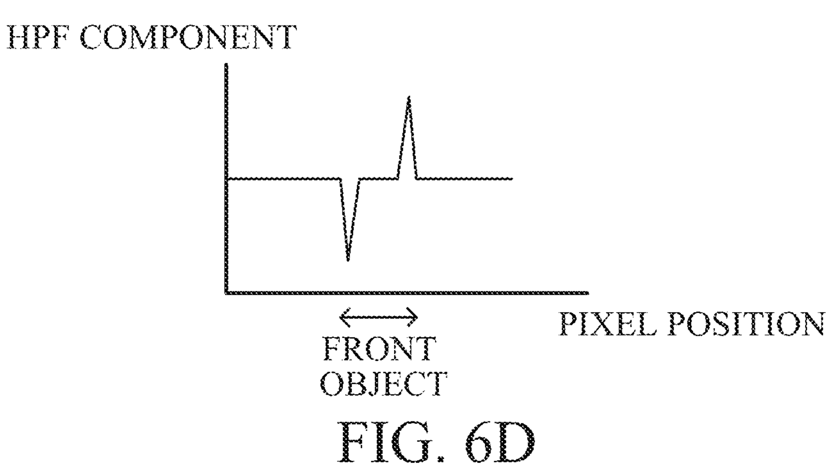
FIG. 6D

IMAGE PROCESSING APPARATUS, IMAGE PICKUP APPARATUS, AND IMAGE PROCESSING METHOD

BACKGROUND

Technical Field

One of the aspects of the embodiments relates to an image processing technology for images generated by imaging.

Description of Related Art

In order to evaluate the deterioration degree, such as image degradation and a handheld blur, of an object in a captured image, a technology to detect the object and a technology to estimate the deterioration at the edge of the object using a point spread function (PSF) may be combined and used. Japanese Patent No. 4334179 discloses a technology for evaluating the in-focus level from edge information about an object. Japanese Patent Laid-Open No. 2009-253936 discloses a technology that calculates a PSF of each of a plurality of captured images obtained by continuous imaging, differently weights a handheld blur amount and an image degradation amount, and evaluates the object degradation for each captured image.

Each of the technologies disclosed in Japanese Patent No. 4334179 and Japanese Patent Application No. 2009-253936 may not be able to properly evaluate a main object in a case where an object as a shield or shielding object, such as a cage in front of an animal at a zoo or a net in front of a volleyball player, shields part of the main object. For example, if the shielding object is in focus but the main object is out of focus, the in-focus level on the main object cannot be correctly evaluated.

SUMMARY

An image processing apparatus according to one aspect of the embodiment includes a memory storing instructions, and a processor configured to execute the instructions to detect a shielding object that shields part of a main object in an evaluation image obtained by imaging the main object, and evaluate deterioration in a portion of the main object excluding the shielding object in the evaluation image.

An image pickup apparatus having the above image processing method also constitutes another aspect of the embodiment. An image processing method corresponding to the above image processing apparatus also constitutes another aspect of the embodiment.

Further characteristics of the disclosure will become apparent from the following description of embodiments with reference to the attached drawings.

BRIEF DESCRIPTION OF THE DRAWINGS

FIGS. 6A, 6B, 6C, and 6D explain object detection beyond a shielding object according to Example 1.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Example 1

In Example 1, a user who views a captured image obtained by an image pickup apparatus such as a digital camera and displayed on a rear monitor selects a captured image to be stored and deletes an unnecessary captured image based on whether there is any deterioration such as image degradation and a handheld blur of a main object in the captured image. This example will describe an image processing apparatus installed in an image pickup apparatus, but the image processing apparatus may be a personal computer (PC) separate from the image pickup apparatus.

Figure 1:
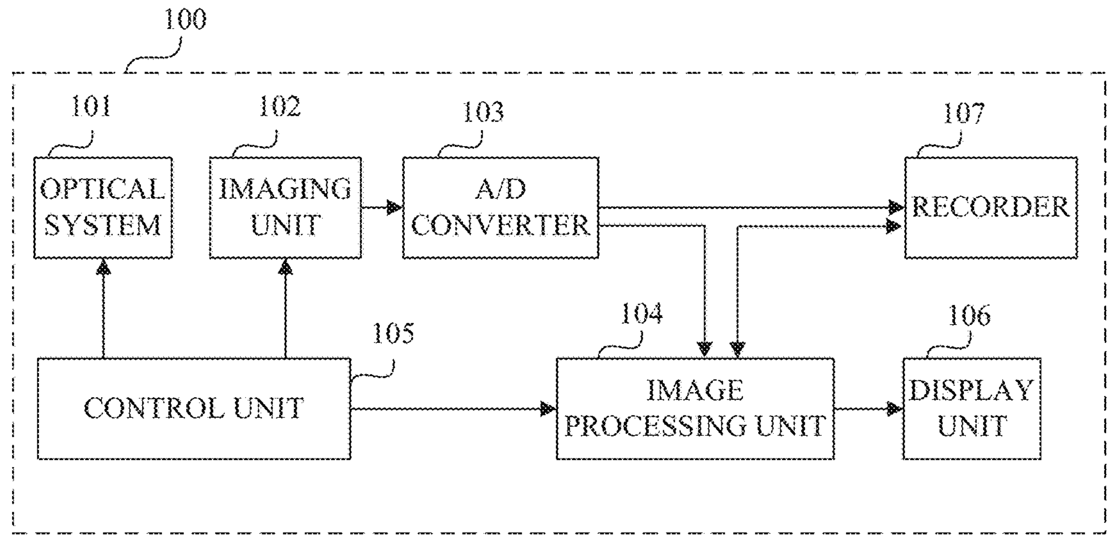
FIG. 1 is a block diagram illustrating the configuration of an image pickup apparatus according to Example 1.

FIG. 1 illustrates the configuration of an image pickup apparatus 100 that includes the image processing apparatus according to Example 1. The image pickup apparatus 100 includes an optical system 101, an imaging unit 102, an A/D converter 103, an image processing unit 104, a control unit 105, a display unit 106, and a recorder 107.

The optical system 101 includes a plurality of lenses including a zoom lens and a focus lens, and an aperture stop. The imaging unit 102 includes an image sensor such as a CCD sensor or a CMOS sensor, photoelectrically converts (images) an object image as an optical image formed by the optical system 101, and outputs an analog imaging signal. The A/D converter 103 converts the analog imaging signal output from the imaging unit 102 into a digital imaging signal.

The image processing unit 104 as an image processing apparatus includes an image processing computer such as a GPU, performs various image processing for the digital imaging signal from the A/D converter 103, and generates live-view image data and recording images. The image processing unit 104 also performs processing for evaluating image data, such as object detection and PSF estimation, which will be described below. The image processing unit 104 can perform similar processing not only for the image data generated from the digital imaging signal from the A/D converter 103 but also for the image data read out of the recorder 107.

The control unit 105 includes a computer such as a CPU, and controls the operation of each operation block included in the image pickup apparatus 100. For example, in order to obtain image data with proper luminance, the control unit 105 calculates an exposure amount during imaging, and controls an F-number (aperture value), shutter speed, gain of the imaging unit 102, etc. based on it.

The display unit 106 displays the image data output from the image processing unit 104 on a display device such as an LCD. The display unit 106 functions as an electronic viewfinder (EVF) by displaying live-view image data generated before recording imaging.

The recorder 107 records image data for recording on a recording medium such as a memory card (semiconductor memory) or a magneto-optical disk.

Figure 2:
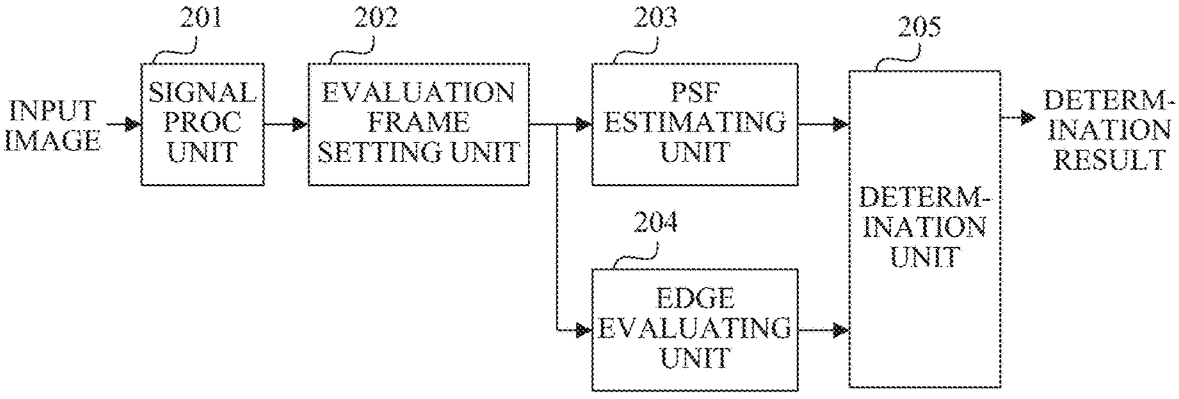
FIG. 2 is a block diagram illustrating the configuration of an image processing unit according to Example 1.

FIG. 2 illustrates the configuration of the image processing unit 104. The image processing unit 104 includes a signal processing unit 201, an evaluation frame setting unit 202, a PSF estimating unit 203, an edge evaluating unit 204, and a determination unit 205.

The signal processing unit 201 performs signal processing such as noise reduction processing, development processing, and gamma conversion (gradation compression) processing. The evaluation frame setting unit 202 detects a specific object (main object) from image data and sets an evaluation frame (evaluation area) as an area for evaluating the deterioration of the detected main object.

The PSF estimating unit 203 performs processing of estimating the point spread function (PSF) within the evaluation frame set by the evaluation frame setting unit 202. The edge evaluating unit 204 evaluates the edges within the evaluation frame set by the evaluation frame setting unit 202 to evaluate deterioration such as a handheld blur and image degradation. The determination unit 205 performs processing of determining whether there is deterioration in the image data using the PSF estimating result from the PSF estimating unit 203. The PSF estimating unit 203, the edge evaluating unit 204, and the determination unit 205 constitute an evaluation unit.

Figure 3:
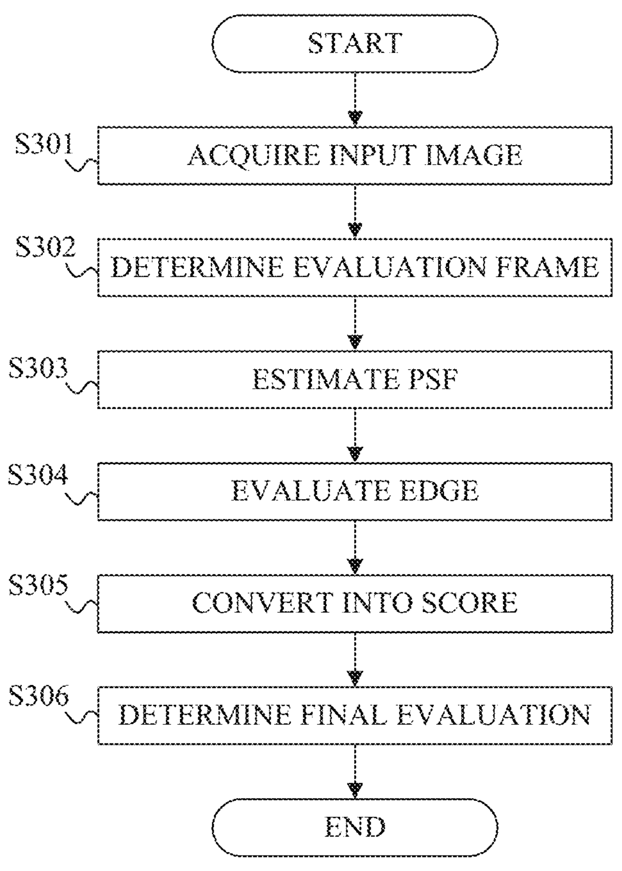
FIG. 3 is a flowchart illustrating processing according to Example 1.

A flowchart in FIG. 3 illustrates processing (image processing method) that the image processing unit 104 executes according to a (computer) program. By performing this processing, the image processing unit 104 evaluates the deterioration of a portion of the main object excluding the shielding object that shields part of the main object in the image data. More specifically, the PSF is estimated on the image data, and the result of determining the presence or absence of deterioration is displayed on the EVF.

In step S301, the image processing unit 104 acquires image data for recording that is a target of the PSF estimation, as an input image. The image processing unit 104 (signal processing unit 201) may acquire the image data as the input image as it is if the image data for recording generated by imaging is in the JPEG format, and if it is in the RAW format, the signal processing unit 201 may acquire the image data in the JPEG format as the input image by performing the development processing.

Next, in step S302, the image processing unit 104 (evaluation frame setting unit 202) determines (sets) an evaluation frame as an area for determining deterioration such as image degradation and handheld blurs in the input image acquired in step S301, and sets an image within the evaluation frame as an evaluation image. In this embodiment, the evaluation image is part of the input image, but the evaluation image may be the entire input image.

In this embodiment, the evaluation frame setting unit 202 detects a person's face as the main object using a known object detecting technology, and sets a rectangular evaluation frame that includes a face. However, the evaluation frame may be arbitrarily set by the user. If the input image includes a plurality of human faces, the evaluation frame may be set in various ways. For example, the evaluation frame may be set to include the face located at the center of the input image or closer to an autofocus (AF) area during the AF, or the evaluation frame may be one arbitrarily selected by the user. The main object to be detected is not limited to a human face, but may also be an animal, a vehicle, or the like.

Next, in step S303, the image processing unit 104 (PSF estimating unit 203) estimates a PSF representing a characteristic relating to deterioration such as a handheld blur and image degradation in the evaluation image set in step S302. The known technology can be used to estimate the PSF. An example of the PSF estimation will be described below.

The following equation (1) is satisfied in a case where noise contained in the evaluation image is ignored:

$$B = Conv(K, L) \tag{1}$$

where B is an image signal in an area of the evaluation image where the PSF is to be estimated, K is a PSF to be estimated, L is an undegraded image (latent image) in the area where the PSF is to be estimated, and Conv represents a convolution operation. Since equation (1) cannot be analytically solved because both K and L are unknown, the following estimation will be made.

First, the initial value of the proper latent image L is determined. For example, an image obtained by performing edge enhancement processing for the evaluation image using a shock filter or the like is used as the initial value of the latent image L. Next, K that is an unknown value and minimizes an energy function E(K) is calculated using the following equation (2):

$$E(K) = \text{argmin}_k\left(\|B - Conv(K, L)\|^2 + \sigma_k^2\right) \tag{2}$$

where L is a fixed value, and $\sigma_k$ is a regularization term, and here the L2 norm is used to calculate the sum of squares of each element of the PSF.

Next, using the calculated K, L that minimizes the energy function E(L) is calculated using the following equation (3):

$$E(K) = \text{argmin}_L\left(\|B - Conv(K, L)\|^2 + \sigma_L^2\right) \tag{3}$$

where K is fixed, L is an unknown value, $\sigma_L$ is a regularization term, and here the L2 norm is used to calculate the sum of squares of each pixel value of the latent image L.

Figure 4:
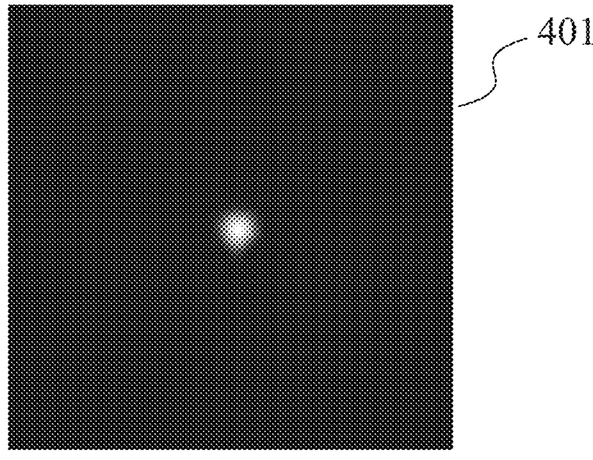
FIG. 4 illustrates a PSF estimation result in Example 1.

Next, the calculated L is used to calculate K that minimizes the energy function E(K), and the PSF is estimated by repeating processing of calculating L that minimizes the energy function E(L) using the calculated K until the calculated K converges to a constant value. FIG. 4 illustrates a PSF 401 obtained as a result of the PSF estimation described above.

Next, in step S304, the image processing unit 104 (edge evaluating unit 204) evaluates how many edges that satisfy a predetermined condition are included in the evaluation image set in step S302, and determines whether there is significant image degradation based on the evaluation result. Details of this processing will be described below.

Next, in step S305, the image processing unit 104 (determination unit 205) performs processing of converting the PSF 401 estimated in step S303 into a score. In a case where there is no image degradation in the evaluation image, the PSF becomes small, but in a case where there is image degradation in the evaluation image, the PSF significantly widens. In a case where there is a handheld blur in the evaluation image, the PSF has a characteristic of extending in the handheld blur direction, so an integral value is calculated as the score as an index of the magnitude of the PSF.

The score calculating method is not limited to integration, and other methods may be used. For example, in order to pay attention to how much the PSF has expanded, a circumscribed rectangle of an area where the PSF has non-zero values may be calculated, and the length of the long side of the rectangle may be used as the score. Alternatively, a score calculated using a plurality of mutually different calculation methods may be used.

Next, in step S306, the image processing unit 104 (determination unit 205) determines, as a final evaluation result, one of the evaluation results obtained in step S304 as the determination result of the presence or absence of large image degradation and the score (evaluation result) obtained in step S305, which has a higher deterioration degree. Then, this flow ends.

Figure 5:
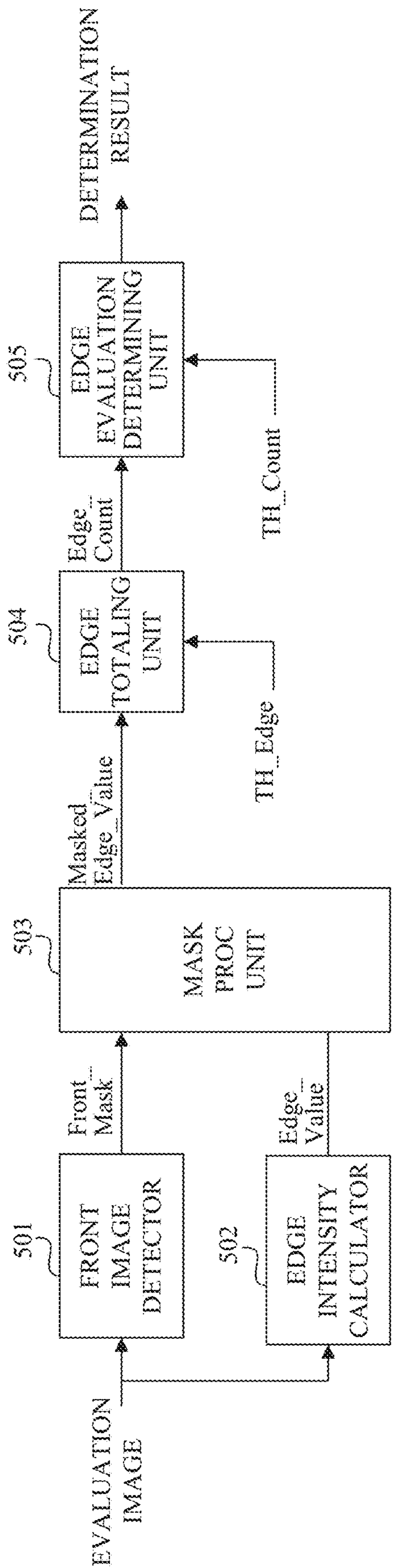
FIG. 5 is a block diagram illustrating the configuration of edge evaluating processing according to Example 1.

Referring to FIGS. 5, 6A, 6B, 6C, and 6D, a description will be given of the processing executed by the edge evaluating unit 204 in step S304. FIG. 5 illustrates the configuration inside the edge evaluating unit 204. The edge evaluating unit 204 includes a front object detector 501, an edge intensity calculator 502, a mask processing unit 503, an edge totaling unit 504, and an edge evaluation determining unit 505.

In FIG. 5, the front object detector 501 detects a front object (shielding object) that is located in front of a main object to be evaluated in the evaluation image and is imaged so as to shield part of the main object. The front object is detected by processing that assumes an object that frequently becomes the front object and detects its characteristic. For example, in capturing an image of a player playing a sport that uses a net, such as volleyball or badminton, the net is the front object for the player. Referring now to FIGS. 6A, 6B, 6C, and 6D, a method for detecting the net included in the evaluation image.

In an evaluation image 601 illustrated in FIG. 6A, part of a main object 602 is shielded by a net 603 as a front object. The front object detector 501 sets a target area (detection area) 604 of a predetermined size of N×N pixels in part of the evaluation image 601, as illustrated in FIG. 6B. FIG. 6C illustrates changes in pixel values of the pixels of the front object 603 and other pixels in the target area 604 in the horizontal direction.

As illustrated in FIG. 6D, the front object detector 501 acquires a change in a value of a high-pass filter (HPF) component in the horizontal direction by applying the HPF to the pixel values of the target area 604 in the horizontal direction. By applying the HPF only to the target area 604, the processing load can be reduced. As illustrated in FIG. 6D, the HPF component values of the front object 603 have a characteristic in which HPF component values of the same amplitude and different signs appear close to each other. Therefore, by summing the HPF component values of mutually different signs included in the target area 604, the result becomes close to zero. The front object detector 501 can detect the front object 603 by calculating a characteristic amount Front_Value expressed in the following equation (4). That is, the front object 603 can be detected by detecting the characteristic relating to the pixel values of the target area 604.

$$\text{Front\_Value} = \left(\left|\sum dx(I) + \sum dy(I)\right|\right) / \left(\sum |dx(I)| + \sum |dy(I)|\right) \quad (4)$$

where dx and dy are HPF processing in the horizontal direction and vertical direction, respectively, I represents the evaluation image 601, dx(I) and dy(I) represent the horizontal HPF component value and vertical HPF component value of the evaluation image I, respectively, and Σ is processing of calculating the sum within the target area 604.

The front object detector 501 calculates a mask Front_Mask for the front object 603 by setting a pixel having a characteristic amount Front_Value equal to or larger than or a predetermined threshold to 1, and setting a pixel having a characteristic amount Front_Value smaller than the predetermined threshold to 0.

The edge intensity calculator 502 calculates the edge intensity Edge_Value expressed in equation (5) for each pixel by performing the HPF processing similar to that of the front object detector 501 for the input evaluation image.

$$\text{Edge\_Value} = \sqrt{\left(dx(I)^2 + dy(I)^2\right)} \quad (5)$$

The mask processing unit 503 receives inputs of Front_Mask calculated by the front object detector 501 and Edge_Value calculated by the edge intensity calculator 502. The mask processing unit 503 outputs a masked edge intensity Masked_Edge_Value by setting to 0, Edge_Value of the pixel whose Front_Mask pixel value is 1.

The edge totaling unit 504 outputs an edge total value Edge_Count by counting the number of pixels larger than a predetermined edge intensity threshold (predetermined intensity) TH_Edge out of the masked edge intensity Masked_Edge_Value.

In a case where the edge total value Edge_Count is smaller than a predetermined edge total threshold Th_Count, the edge evaluation determining unit 505 determines that the main object 602 in the evaluation image 601 has significant deterioration. In a case where the edge total value Edge_Count is larger than the edge total threshold Th_Count, it is determined that there is no significant deterioration in the main object 602 within the evaluation image 601.

As described above, performing the PSF estimation and edge evaluation excluding the front object on the evaluation image can stably evaluate the deterioration of the main object beyond the front object in the evaluation image.

This example obtains the deterioration evaluation result using both the edge evaluation and PSF score, but may obtain the deterioration evaluation result using only one of them.

This example sets the area of the predetermined size of N×N pixels as the target area including the front object in step S304, but the predetermined size must be greater than the size (thickness) of the front object, such as the net. In a case where the front object deteriorates due to image degradation or handheld blurs, the front object may be larger than N×N pixels, so the size of the target area 604 may be changed according to the deteriorated state of the front object. That is, the size of the target area 604 may be changed based on the size of the PSF estimated in step S303. For example, in a case where an evaluation image includes a main object that deteriorates due to large image degradation and a front object that deteriorates due to small image degradation, the PSF estimation result often indicates the deterioration degree of the front object, which less deteriorates. Therefore, the estimated size of the PSF can be reflected in the size of the target area 604. By defining the size of the long side of the circumscribed rectangle of the PSF estimated in step S303 as a change amount a, the size of the target area 604 may be set to $(N+\alpha))\times(N+\alpha)$ pixels.

Alternatively, the change amount a may be defined as the possibility of deterioration based on the imaging condition (exposure condition). For example, as the shutter speed during imaging is lower, deterioration is more likely to occur due to camera shake of the image pickup apparatus 100 or motion of the main object. Therefore, the change amount a may be defined according to the shutter speed.

As described above, the size of the target area 604 needs to be larger than the size of the front object, but the size of the front object varies depending on the angle of view during imaging. Therefore, the length N of one side of the target area 604 may be changed based on the detection result of the main object in step S302. For example, by previously determining the ratio of the length N of one side of the target area 604 to the detected size of the main object, N is defined as a value obtained by multiplying the detected size of the main object by the above ratio in step SS302.

In step S304, the front object may be detected using a learning result obtained by previously performing machine learning of a plurality of combinations (data sets) of a captured image of an object that can be the front object and a captured image in which part of the object that can be a target of imaging is shielded by the front object.

Example 2

Figure 7:
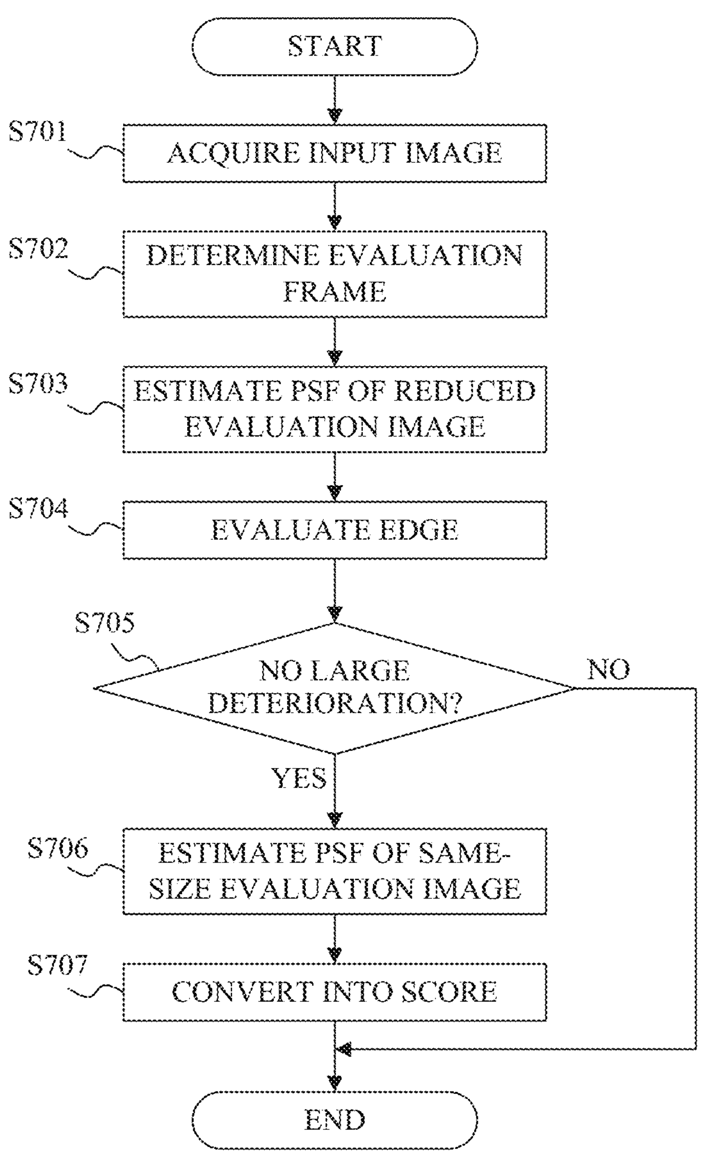
FIG. 7 is a flowchart illustrating processing according to Example 2.

Next follows Example 2. The basic configuration of an image pickup apparatus according to this example is the same as that according to Example 1, and common elements will be designated by the same reference numerals. A flowchart in FIG. 7 illustrates processing that the image processing unit 104 executes according to a program in this example. This example will discuss processing that can reduce the processing time compared to Example 1.

Steps S701 and S702 correspond to steps S301 and S302 in FIG. 3, respectively.

Next, in step S703, the image processing unit 104 (PSF estimating unit 203) estimates a PSF in a reduced state by the PSF estimation to a reduction evaluation image as a second image obtained by processing of reducing the evaluation image as a first image at a predetermined reduction rate.

Next, in step S704, the image processing unit 104 (edge evaluating unit 204) performs edge evaluation for the reduced evaluation image similarly to step S304. Here, the result obtained by multiplying the long side of the circumscribed rectangle of the PSF in the reduced state obtained in step S703 by the reciprocal of the reduction rate is defined as the change amount a, and the size of the target area 604 is set to $(N+\alpha)\times(N+\alpha)$ pixels.

Next, in step S705, the image processing unit 104 (determination unit 205) determines (selects) whether to continue or terminate subsequent processing according to the presence or absence of deterioration due to large image degradation (i.e., deterioration larger than a predetermined size) based on the result of the edge evaluation in step S704. In a case where there is deterioration due to large image degradation, this flow ends, and in a case where there is no such large deterioration (deterioration is smaller than the predetermined size), the flow proceeds to step S706.

In step S706, the image processing unit 104 (PSF estimating unit 203) performs the PSF estimation for the same-size evaluation image (first image), which is a pre-reduction evaluation image, and acquires the PSF.

In step S707, the image processing unit 104 (determination unit 205) performs processing of converting the PSF obtained in step S706 into a score, similarly to step S305. Then, this flow ends.

The processing corresponding to step S306 is omitted due to the determination processing in step S705.

This example can reduce the overall processing time by adding the determination processing (step S705) for omitting the PSF estimation to the same-size evaluation image in step S706, which takes a long processing time.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can evaluate deterioration of a main object beyond a shielding object in a captured image.

This application claims priority of Japanese Patent Application No. 2023-015071, filed on Feb. 3, 2023, which is hereby incorporated by reference herein in its entirety.

What is claimed is:

1. An image processing apparatus comprising:
a memory storing instructions; and
a processor configured to execute the instructions to:
detect a shielding object that shields part of a main object in an evaluation image obtained by imaging the main object,
evaluate deterioration in a portion of the main object excluding the shielding object in the evaluation image, and
perform processing of reducing a first image as the evaluation image,
wherein the processor is configured to: evaluate the deterioration in a second image obtained by the processing of reducing the first image, and
determine whether or not to evaluate the deterioration in the first image according to an evaluation result in the second image.

2. The image processing apparatus according to claim 1, wherein the processor is configured to detect the shielding object based on a characteristic about pixel values corresponding to the shielding object.

3. The image processing apparatus according to claim 1, wherein the processor is configured to detect the shielding object using a result of machine learning of a combination of a captured image of an object that can be the shielding object and a captured image in which the object that can be the shielding object shields part of an object that can be imaged.

4. The image processing apparatus according to claim 1, wherein the processor is configured to detect the shielding object in part of a detection area of the evaluation image.

5. The image processing apparatus according to claim 4, wherein the processor is configured to change a size of the detection area according to at least one of a deteriorated state of the shielding object in the evaluation image and an exposure condition in the imaging.

6. The image processing apparatus according to claim 1, wherein the processor is configured to evaluate the deterioration using a number of pixels having an edge intensity higher than a predetermined intensity in the evaluation image.

7. The image processing apparatus according to claim 1, wherein the processor is configured to evaluate the deterioration using a point spread function obtained from the evaluation image.

8. The image processing apparatus according to claim 1, wherein the processor is configured to set, to a final evaluation result, one of an evaluation result of the deterioration using a number of pixels having an edge intensity higher than a predetermined intensity in the evaluation image and an evaluation result of the deterioration using a point spread function obtained from the evaluation image, which one has a higher deterioration degree.

9. The image processing apparatus according to claim 8, wherein the processor is configured to evaluate the deterioration in the first image in a case where the evaluation result indicates that the deterioration in the second image is smaller than a predetermined size.

10. An image pickup apparatus comprising:
an image sensor;
a memory storing instructions; and
a processor configured to execute the instructions to:
detect a shielding object that shields part of a main object in an evaluation image obtained by imaging the main object,
evaluate deterioration in a portion of the main object excluding the shielding object in the evaluation image, and
perform processing of reducing a first image as the evaluation image,
wherein the processor is configured to: evaluate the deterioration in a second image obtained by the processing of reducing the first image, and
determine whether or not to evaluate the deterioration in the first image according to an evaluation result in the second image.

11. The image pickup apparatus according to claim 10, wherein the processor is configured to detect the shielding object based on a characteristic about pixel values corresponding to the shielding object.

12. The image pickup apparatus according to claim 10, wherein the processor is configured to detect the shielding object using a result of machine learning of a combination of a captured image of an object that can be the shielding object and a captured image in which the object that can be the shielding object shields part of an object that can be imaged.

13. The image pickup apparatus according to claim 10, wherein the processor is configured to detect the shielding object in part of a detection area of the evaluation image.

14. The image pickup apparatus according to claim 13, wherein the processor is configured to change a size of the detection area according to at least one of a deteriorated state of the shielding object in the evaluation image and an exposure condition in the imaging.

15. An image processing method comprising the steps of:
detecting a shielding object that shields part of a main object in an evaluation image obtained by imaging the main object,
evaluating deterioration in a portion of the main object excluding the shielding object in the evaluation image,
performing processing of reducing a first image as the evaluation image,
evaluating the deterioration in a second image obtained by the processing of reducing the first image, and
determining whether or not to evaluate the deterioration in the first image according to an evaluation result in the second image.

16. The image processing method according to claim 15, wherein the detecting step detects the shielding object based on a characteristic about pixel values corresponding to the shielding object.

17. The image processing method according to claim 15, wherein the detecting step detects the shielding object using a result of machine learning of a combination of a captured image of an object that can be the shielding object and a captured image in which the object that can be the shielding object shields part of an object that can be imaged.

18. The image processing method according to claim 15, wherein the detecting step detects the shielding object in part of a detection area of the evaluation image.

19. The image processing method according to claim 18, wherein the detecting step changes a size of the detection area according to at least one of a deteriorated state of the shielding object in the evaluation image and an exposure condition in the imaging.

* * * * *